United States Patent [19]
Moss et al.

[11] Patent Number: 5,105,287
[45] Date of Patent: Apr. 14, 1992

[54] REDUCTION OF HOLOGRAPHIC NOISE WITH SHORT LASER PULSES

[75] Inventors: Gaylord E. Moss, Marina del Rey; John E. Wreede, Monrovia, both of Calif.

[73] Assignee: Hughes Aircraft Company, Los Angeles, Calif.

[21] Appl. No.: 637,978

[22] Filed: Jan. 9, 1991

Related U.S. Application Data

[63] Continuation of Ser. No. 347,112, May 3, 1989, abandoned.

[51] Int. Cl.$^5$ .............................................. G02B 1/04
[52] U.S. Cl. .......................................... 359/3; 359/10; 359/35
[58] Field of Search .................. 350/3.6, 3.61, 3.62, 350/3.64, 3.67

[56] References Cited

U.S. PATENT DOCUMENTS

| | | | |
|---|---|---|---|
| 4,367,911 | 1/1983 | Graube | 350/3.61 |
| 4,378,141 | 3/1983 | Yerick | 350/3.61 |
| 4,456,328 | 6/1984 | Arns et al. | 350/3.6 |
| 4,458,977 | 7/1984 | Arns et al. | 350/3.6 |
| 4,458,978 | 7/1984 | Arns et al. | 350/3.67 |
| 4,472,053 | 9/1984 | Wyatt | 356/121 |
| 4,498,740 | 2/1985 | Caulfield | 350/3.66 |
| 4,696,009 | 9/1987 | Süse et al. | 372/102 |
| 5,015,049 | 5/1991 | Chung | 350/3.81 |

Primary Examiner—Bruce Y. Arnold
Assistant Examiner—J. P. Ryan
Attorney, Agent, or Firm—Leonard A. Alkov; Wanda K. Denson-Low

[57] ABSTRACT

A pulsed laser provided a pulsed incident beam which impinges a recording assembly which includes a glass substrate and a recording film adhered thereto. The pulse can be singular or multiple. In either event, the duration of each pulse of light is controlled in such a fashion so that the pulse is long enough to enable it to reflect off of a reflecting element to thereby produce a primary reflected beam. In the recording film, the primary reflected beam can interfere with the incident beam to produce the interference pattern in the film. However, the pulse is not of such a duration to allow a noise reflected beam, such as one from a glass-air interface, to pass through the recording film and interfere with the incident beam or primary reflected beam while those beams are still present. Thereby, noise holograms which might otherwise be recorded in the film are precluded while allowing the primary hologram to be recorded.

10 Claims, 2 Drawing Sheets

PRIMARY LASER BEAM

PRIMARY REFLECTED BEAM

SURFACE REFLECTION

REDUCTION OF HOLOGRAPHIC NOISE WITH SHORT LASER PULSES

This is a continuation of application Ser. No. 07/347,112 filed May 3, 1989, now abandoned.

BACKGROUND OF THE INVENTION

1. Field of the Invention

This invention generally relates to a system and method for reducing holographic noise and, more specifically, to an improved system and method for eliminating noise by controlling the duration of an incident beam during construction of the primary hologram.

2. Description of Related Art

High quality holographic optical elements are used in diffraction optic display systems, such as head up displays (HUDs), for advanced aircraft, helmet mounted displays, laser protective devices, narrow band reflective filters, and holographic high gain screens for simulators. These are only a few of the many uses of high quality reflective holograms.

One of the critical problems in diffraction optic display systems utilizing a replicated hologram has been a degration of the holographic images as a result of the effects of spurious reflection in transmission hologram recordings that are frequency generated during the holographic recording process. Perhaps the most damaging spurious noise holograms are generated by reflections from surfaces which are interfaces of materials of different indexes of refraction, such as air/glass interfaces of the transparent surfaces of a recording cover plate, a hologram substrate, the recording medium itself, and optical elements used to generate the recording beams. These reflections can combine with the primary holographic beams at the recording film to form spurious reflection holograms, when the beams are in the opposite direction, and spurious transmission holograms when the beams are in the same direction. A subsequent display system using this hologram will be degraded by ghost images from the spurious reflection hologram recordings, and rainbow-like flair patterns from the spurious transmission hologram recordings.

The related art has attempted to solve these problems in several different ways. A simple approach has been to form the hologram with energy beams that strike the recording material surfaces at Brewster's angle, at which reflections are at a minimum. This method has very limited application because in general the incident angle is set by the desired holographic function, and is not a variable that one can select at will.

Antireflective coatings on the glass-air interfaces have been used, but the drawbacks include the need to cover a range of input/output angles.

Another approach has been to reduce the spurious reflections by attempting to match the indexes of refraction at the different surface interfaces with an index matching fluid, such as a mineral oil. The entire recording module is immersed in an index of refraction matching fluid bath. The shape of the container is then designed so that surface reflections are directed away from the recording material. For many optical configurations, such a shape does not exist. Furthermore, the phase instability of the optical paths in fluid degrade the desired hologram. Also, the problems of stabilizing the fluid after each plate change, the need to frequently clean the fluid of impurities, and the delays in handling the volume of fluid needed all make this method unsuitable for production.

More sophisticated approaches are disclosed in U.S. Pat. Nos. 4,458,977, 4,458,978, and 4,456,328, in which spurious holograms caused by glass/air interfaces are eliminated by moving an outside cover plate to change the phase of the reflected rays relative to the primary beams during the recording period. Thereby, spurious holograms are not formed. For these approaches that use a moving cover plate, the rate of movement or phase change is a function of the exposure time which depends on the sensitivity of the recording medium. The total movement must provide a phase change of at least one half wavelength in the reflected spurious hologram beams to nullify or "smear out" any spurious interference patterns that would otherwise be recorded. While those systems have advantages, they still have certain disadvantages. For example, the drivers to move the cover plate take time to adjust, calibrate, and test. The complete apparatus is complex to set up, needs long stabilization time, and has many modes of potential failure to decrease yield. Also, since the moving cover plate is another piece of glass and the substrate itself does not have air/glass interface, the substrate cannot have an antireflective coating which is optimized for its final use with an air/glass interface. This necessitates the subsequent addition of a coating or another piece of glass which is coated.

Another attempt to suppress spurious holograms is disclosed in U.S. Pat. No. 3,601,017. Therein, an immersion liquid is applied to either the surface of the recording medium or the surface of a transparent support member, which surface is remote from the direction of light incidence. The thickness of the immersion agent layer is varied over time during an exposure by evaporation or, when it is not so readily evaporated, by generating acoustic or surface waves which, during their reflection, directionally modulate the wave field in the liquid. Preferably, the transparent immersion liquid is O-xylene. This system also has drawbacks, including the fact that the evaporating liquid is not a good optical surface. Further, the variation in thickness would not appear to be highly regulated, particularly when using generated waves.

A need still exists in the technology to provide an improved system and method for producing a high quality hologram that has minimal spurious holograms and at the same time can be produced in an economical and efficient manner.

SUMMARY OF THE INVENTION

The present invention seeks to overcome disadvantages found in the prior and related art by providing an exposure system which, in one preferred embodiment, utilizes a single beam arrangement. A pulsed laser provides a pulsed incident beam which impinges a recording assembly which includes a glass substrate and a recording film adhered thereto. The pulse can be singular or multiple. In either event, the duration of each pulse of light is controlled in such a fashion so that the pulse is long enough to enable it to reflect off of a reflecting element to thereby produce a primary reflected beam. In the recording film, the primary reflected beam can interfere with the incident beam to produce the interference pattern in the film. However, the pulse is not of such a duration to allow a noise reflected beam, such as one from a glass-air interface, to pass through the recording film and interfere with the incident beam or primary reflected beam while those beams are still present. Thereby, noise holograms which might otherwise be recorded in the film are precluded while allowing the primary hologram to be recorded.

The objects of the present invention can best be seen from an examination of the accompanying specification, claims, and drawings hereto.

DESCRIPTION OF THE PREFERRED EMBODIMENTS

The following specification is provided to enable any person skilled in the art to which the present invention pertains, or with which it is most nearly connected, to make and use the same, and sets forth the best mode contemplated by the inventors of carrying out their invention.

Figure 1:
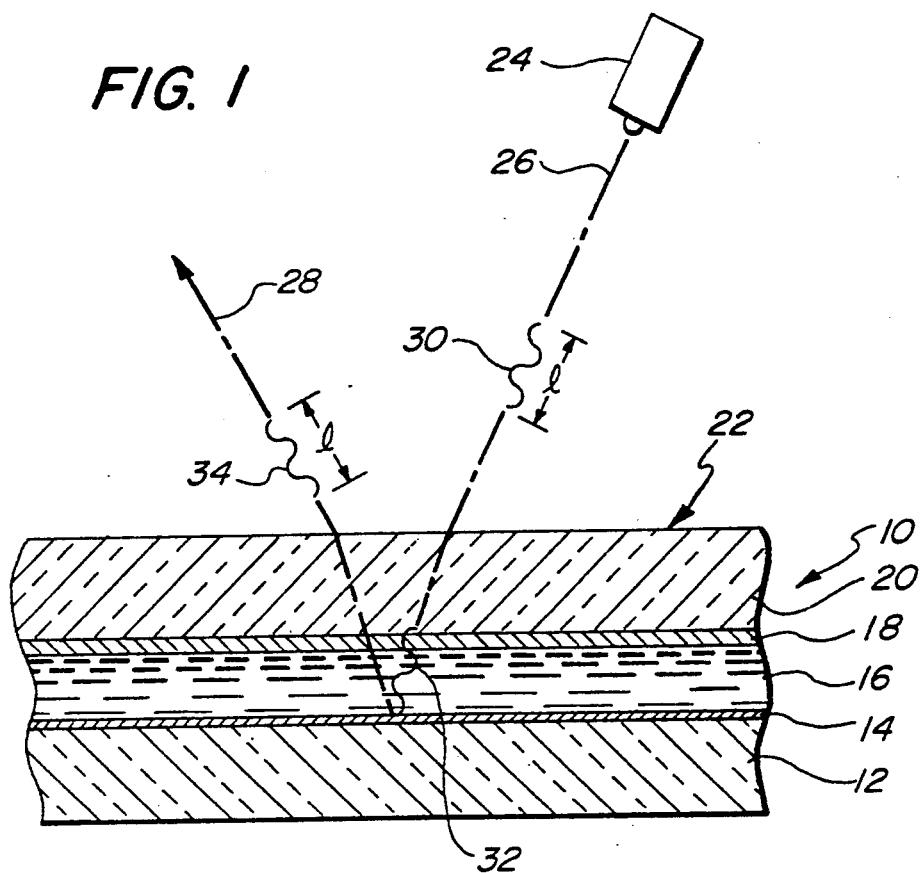
FIG. 1 is a diagrammatical side view depicting a single beam exposure system with multiple pulses according to the present invention.

FIG. 1 is a partial, diagrammatical view of a single beam exposure system for constructing a hologram according to the present invention. In the system, a recording assembly 10 is provided which includes, at its bottommost portion thereof, a substrate 12 which can, for example, be made of glass. A reflection element 14 is adhered to a top surface of the substrate 12 and may be, for example, a hologram or mirror which is capable of reflecting incident beams from a light source. Also, in this particular embodiment, a matching fluid 16, such as mineral oil, is provided above the reflection element 14 for purposes of matching indexes of refraction, as is well known in the art. A recording film 18, such as gelatin, is positioned above the matching fluid 16 and is supported by a substrate 20 which, for example, can be made of glass. A glass-air interface 22 is thereby provided on a top surface of the substrate 20, when viewed from FIG. 1.

A light source 24, such as a pulsed laser, is capable of directing an incident beam of energy 26 towards the recording assembly 10. (For a general discussion of pulsed-laser holography, see Collier, Optical Holography, Chapter 11 (1971), which is incorporated herein by reference.) As will be discussed in further detail hereinafter, the light source 24 produces the incident beam 26 in the form of a single or multiple pulses. As shown in FIG. 1, according to one embodiment, the incident beam 26 includes multiple pulses 30, 32, the latter pulse being shown as striking the reflection element 14. Thereupon, a primary reflected beam 28 is produced which is in the form of pulses, one of which is denoted reference numeral 34. Each of the pulses 30, 32, 34 are of a duration or length denoted 1.

Figure 2:
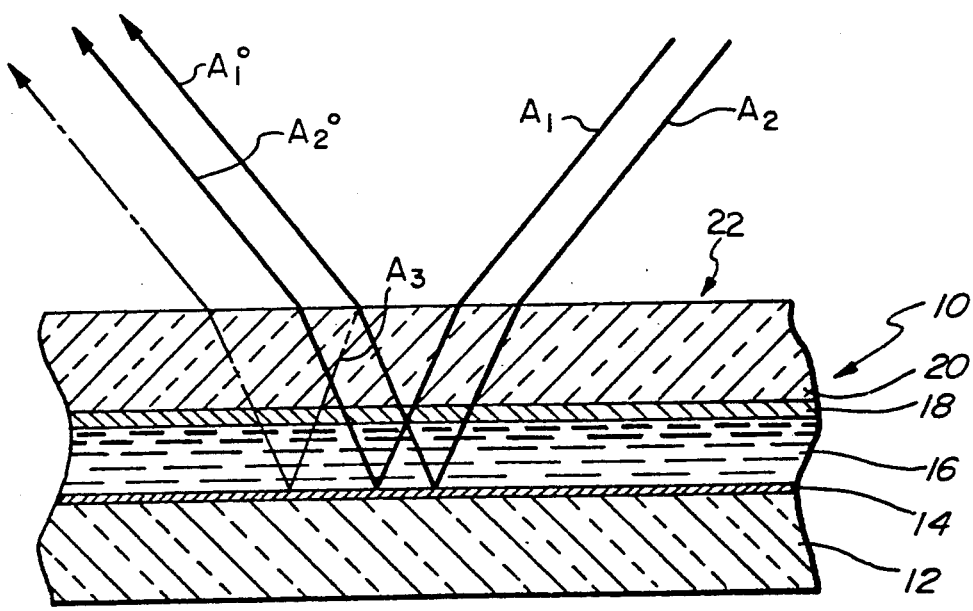
FIG. 2 depicts incident beams interfering with primary reflected beams with the potential interaction with noise reflected beams.

For purposes of illustration, and in referring to FIG. 2, the light source 24 may produce incident beams $A_1$, $A_2$ which are directed towards the recording assembly 10. Upon striking the reflection element 14, the incident beams produce primary reflected beams $A_1^0$, $A_2^0$. FIG. 2 further depicts the incident beam $A_1$ intersecting the primary reflected beam $A_2^0$ in the recording film 18, which provides the primary hologram. In addition, the primary reflected beam $A_2^0$ produces a noise or surface reflection beam $A_3$, which is caused by the beam $A_2^0$ reflecting at the glass-air interface 22. It can be seen that the noise reflection beam $A_3$ is directed down towards the reflection element 14 and is then reflected out of the recording assembly 10. Still referring to FIG. 2, in an exposure system which does not utilize the short pulses in accordance with the present invention, it is known that the noise reflected beam $A_3$ may interfere with the primary reflected beam $A_1^0$ in the recording film 18 and thereby produce an unwanted noise hologram.

Figure 3A:
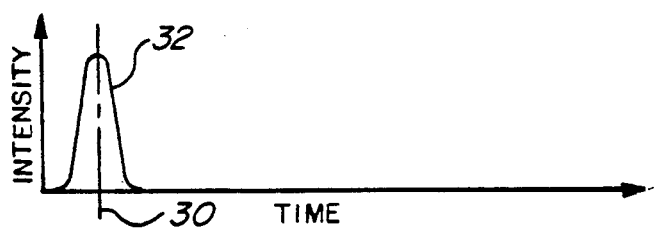
FIG. 3a is a graph showing intensity of the incident or primary laser beam as a function of time.
Figure 3B:
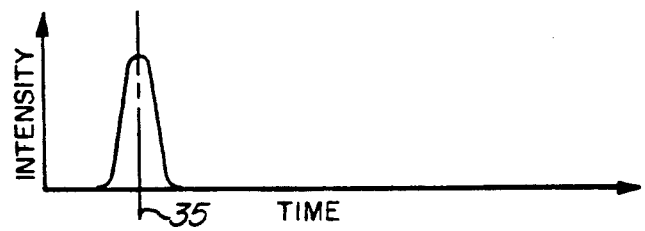
FIG. 3b is a graph showing intensity of the primary reflected beam as a function of time.
Figure 3C:
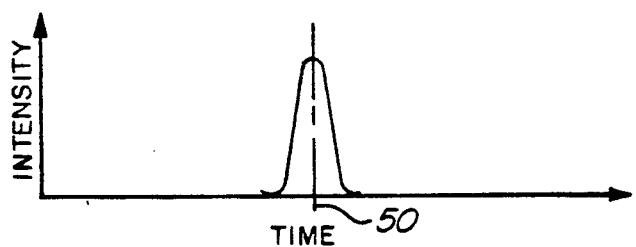
FIG. 3c is a graph depicting intensity of a noise or surface reflection beam as a function of time.

In order to preclude or minimize the occurrence of a situation of the noise reflected beam $A_3$ producing a noise hologram, as mentioned above, the present invention utilizes short pulses of light such that any primary reflected beam, such as $A_1^0$, will not be of a duration which is long enough to interfere with a noise reflected beam, such as $A_3$, which is depicted in FIGS. 3a, 3b, 3c. For purposes of example, and in accordance with a second preferred embodiment, FIG. 3a graphically depicts intensity of a single primary laser or incident beam from the light source as a function of time. In this particular embodiment, and only for purposes of example, pulse 32 has a maximum intensity which occurs at a time 30. In FIG. 3b, the graph shows the intensity of the primary reflected beam as a function of time which, in this particular example, occurs at time 35. In FIG. 3c, the graph shows the intensity of the noise or surface reflection beam as a function of time whose maximum intensity occurs at time 50. In comparing FIG. 3a and FIG. 3b, it can be appreciated that the incident beam partially overlaps the primary reflected beam which indicates that an interference pattern can be produced in the recording film. However, when FIG. 3c is compared to FIGS. 3a, 3b, the noise or surface reflection beam occurs at a time which does not allow for overlap with either the incident beam or the primary reflected beam. As a result, the surface reflection beam cannot interfere with either the incident or primary reflected beams in the recording film to produce a noise hologram.

For purposes of illustration, and referring back to FIG. 1, the thickness of the matching fluid 16 can be approximately 0.1 inches, the thickness of the recording film 18 being approximately 0.001 inches, and the substrate 20 being approximately 0.25 inches. If the light source 24 is then positioned at an angle of about 20 degrees to the glass-air interface 22, then each pulse of light can be limited in duration from about 1.6 picoseconds to about 6.0 picoseconds. In the context of multiple pulses, the time between pulses must be greater than the calculated pulse length. Of course, with a single pulse there is no such concern. As can be seen, depending upon the thickness parameters of the recording assembly 10, the length or duration of each pulse is chosen up to a maximum amount which allows enough time for the pulse to reflect off the reflection element 14, interfere in the recording film 14, and then be terminated in time such that any noise reflected beam cannot interfere in the recording film.

Figure 5:
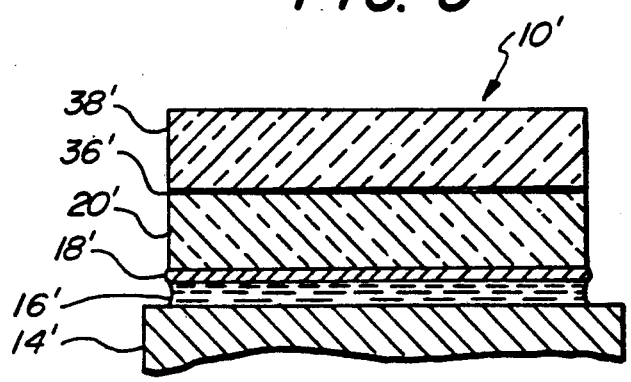
FIG. 5 is another embodiment of the recording assembly according to the present invention.

Another embodiment of a recording assembly in accordance with the present invention is shown in FIG. 5. Therein, the recording assembly 10' includes a reflection element 14', a matching fluid 16', a recording film 18', and a substrate 20', all of which are similar in construction to that described with respect to the embodiment above in FIG. 1. However, in this preferred embodiment, a second substrate 38' is adhered, via a conventional adhesive 36', to the first substrate 20'. In this fashion, the distance which a noise reflection beam must travel from a glass-air interface to the recording film is significantly increased. Thereby, the likelihood of such noise reflection beam interacting with either an incident beam or a primary reflected beam in the recording film is significantly reduced. By way of example, for the embodiment disclosed in FIG. 5, the thickness of the second substrate 38' can be approximately 1.0 inches, the first substrate 20' can be approximately 0.25 inches. The recording film 18' can then be approximately 0.001 inches, while the matching fluid 16' is approximately 0.1 inches in thickness. With those dimensions, it is possible to use a light whose pulses are of a duration of approximately 2.5 picoseconds.

Figure 4:
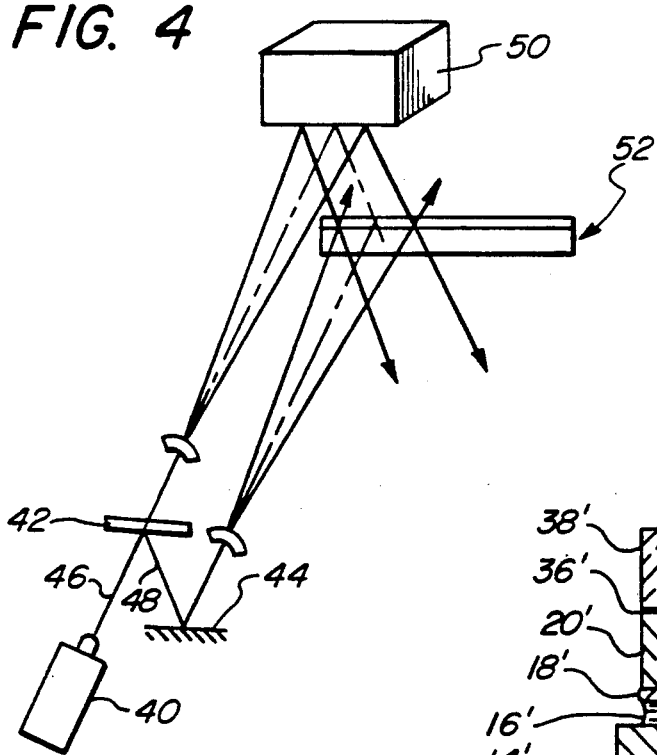
FIG. 4 is a double beam exposure system for producing a hologram according to the present invention.

While the above exposure system has been described in the context of a single beam system (FIG. 1), the present invention contemplates the utilization of a double beam system, as shown in FIG. 4. A light source 40 produces an incident beam 46 which passes through a beam splitter 42. Thereby, a split beam 48 is produced and directed towards a reflecting element 44. The split beam 48 then reflects into a recording assembly 52. Likewise, the incident beam 46 impinges an object 50 and is reflected into the recording assembly 52 where the incident beam 46 interferes with the split beam 48. The recording assembly 52 has a conventional holographic exposure arrangement, such as a gelatin film, between two glass substrates. Generally, the path lengths of the beams 46, 48 are manipulated such that the path lengths are about equivalent. Thereby, the beams reach the recording film at the same time. However, as with the single beam embodiment, the light pulses can be selected to have a duration such that noise beams reflected from the glass/air interfaces cannot interfere with the incident beam 46, the split beam 48, and their respective primary reflected beam. Further, the present invention contemplates that one glass substrate can be made twice as thick as the other substrate to minimize interference pasterns produced by two noise beams.

The above describes only specific embodiments of the present invention, and it is contemplated that various modifications to the above can be made but which nevertheless come within the scope of the present invention as defined in the accompanying claims.

What is claimed is:

1. A method of constructing a hologram in a recording medium disposed between a reflective surface and a semitransparent medium, comprising the steps of:
   generating an incident beam comprising at least one light pulse;
   directing said incident beam through said semitransparent medium and said recording medium and reflecting said incident beam off said reflective surface, thereby generating a primary reflected beam, said primary reflected beam interacting with an interface of said semitransparent medium with air to generate a reflected noise beam, said reflected noise beam being reflected back into said recording medium; and
   limiting the duration of said at least one light pulse such that the reflected noise beam does not overlap said incident beam and said primary reflected beam in time in said recording medium.

2. The method according to claim 1 further including the step of causing the duration of said incident beam to overlap with the duration of said primary reflected beam.

3. The method according to claim 1 wherein said incident beam comprises a plurality of successive incident pulses of light, each said incident pulse of light being limited in duration so as not to optically interfere with the reflected noise beam created by the immediately preceding pulse of said succession of incident pulses.

4. The method according to claim 1 wherein the steps of exposing and limiting occur with a single beam exposure system.

5. The method according to claim 4 wherein said exposure system includes a pulsed laser to provide said incident beam.

6. An apparatus for holographic exposure, comprising:
   a substrate of a predetermined thickness;
   a recording medium having a top surface positioned on a surface of said substrate and a bottom surface;
   reflective means positioned adjacent the bottom surface of said recording medium for reflecting a light pulse incident thereon back toward and through said recording medium; and
   means for generating an incident light beam comprising at least one incident light pulse, for directing said incident light pulse through said recording medium to said reflective means, thereby generating a primary reflected pulse, the primary reflected pulse being directed back through said recording medium and substrate, thereby generating a noise pulse reflected from said substrate back into said recording medium, and for limiting the duration of said incident light pulse such that said noise pulse does not overlap said incident light pulse and said primary reflected pulse in time in said recording medium.

7. The apparatus according to claim 6 wherein said means for generating includes a pulsed laser.

8. The apparatus according to claim 6 wherein said substrate comprises glass and said noise pulse is reflected from a surface of said substrate comprising a glass-air interface.

9. The apparatus according to claim 6 wherein said reflecting means comprises a second substrate having a reflecting element attached thereto.

10. A method of constructing a hologram in a recording medium disposed between a reflective surface and a substrate surface, comprising the steps of:
    generating an incident beam comprising at least one incident light pulse;
    directing said incident light pulse through said recording medium and reflecting said incident beam off said reflective surface, thereby generating a primary reflected pulse, said primary reflected pulse generating a noise pulse reflected off said substrate surface back into said recording medium; and
    limiting the duration of said at least one light pulse such that said noise pulse does not overlap said incident light pulse and said primary reflected pulse in time in said recording medium.

* * * * *